United States Patent [19]

Cushing

[11] Patent Number: 4,960,310

[45] Date of Patent: Oct. 2, 1990

[54] BROAD BAND NONREFLECTIVE NEUTRAL DENSITY FILTER

[75] Inventor: David H. Cushing, North Reading, Mass.

[73] Assignee: Optical Corporation of America, Westford, Mass.

[21] Appl. No.: 389,545

[22] Filed: Aug. 4, 1989

[51] Int. Cl.⁵ .......................... G02B 5/20; G02B 5/22
[52] U.S. Cl. ..................................... 350/1.7; 350/1.1; 350/1.6; 350/166; 350/311; 350/314
[58] Field of Search ................. 350/314, 311, 1.6, 1.7, 350/163, 165, 164, 166, 1.1

[56] References Cited

U.S. PATENT DOCUMENTS

| | | | |
|---|---|---|---|
| 3,649,359 | 3/1972 | Apfel et al. | 350/165 X |
| 3,990,784 | 11/1976 | Gelber | 350/166 |
| 4,556,599 | 12/1985 | Sato et al. | 350/164 X |
| 4,856,019 | 8/1989 | Miyata et al. | 350/164 X |

FOREIGN PATENT DOCUMENTS

| | | | |
|---|---|---|---|
| 2027925 | 2/1980 | United Kingdom | 350/314 |
| 2134282 | 8/1984 | United Kingdom | 350/166 |

Primary Examiner—Bruce Y. Arnold
Assistant Examiner—David R. Parsons
Attorney, Agent, or Firm—Weingarten, Schurgin, Gagnebin & Hayes

[57] ABSTRACT

A broad band low reflectance neutral density optical filter. A neutral density filter having substantially flat transmittance and low reflectivity over a wide range of wavelengths from the ultraviolet through the visible region of the spectrum includes a transparent substrate, two successive layers of different dielectric materials on the substrate, at least two layers of metallic material, each metallic layer being separated from the preceding metallic layer by a layer of dielectric material, and finally, two succeeding layers of different dielectric mateials. The resultant neutral density filter thus has two layers of different dielectric materials between the substrate and the first layer of metallic material, and two layers of different dielectric materials between the atmosphere and the final layer of metallic material. This construction provides physical and spectral stability, relatively constant transmittance as a function of wavelength, and low reflectivity from both sides of the filter as a function of wavelength, which in turn permits a number of filters of the invention to be employed in series.

10 Claims, 12 Drawing Sheets

BROAD BAND NONREFLECTIVE NEUTRAL DENSITY FILTER

FIELD OF THE INVENTION

This application relates to optical filters, and more particularly, to broad band low reflectance neutral density optical filters for use in the ultraviolet and visible regions of the spectrum.

BACKGROUND OF THE INVENTION

Neutral density filters to be employed in the visible (VIS) region of the spectrum are commonly constructed of absorbing filter glasses. Such materials are not useful in the ultraviolet (UV) spectral region between 200 and 350 nm, however, since they have strong absorption bands at these wavelengths.

Neutral density filters for use in the UV region are generally metal or metal alloy films on quartz substrates. INCONEL 600 (TM) is the metallic alloy typically selected for such films, because it closely approximates ideal neutrality. Other materials can also serve the same purpose.

A simple film of metal on a transparent substrate functions as an optical filter throughout the UV and VIS spectral ranges, but attenuates light by reflection as well as by absorption, the amount of reflection typically being 4% to 40% from each surface. When two or more such optical filters are placed in series to effect a higher value of optical density, reflections between them cause the resulting optical density to be significantly different from that predicted from Beer's Law. It is difficult to calculate the correct resultant optical density without a detailed knowledge of the reflectance of each surface. Such knowledge is seldom available.

An additional difficulty with simple metallic films is that they generally carry no protective coatings, and thus are not spectrally stable since the outer metal layer oxidizes and some of this oxide is removed upon cleaning.

The combination of high reflectivity and low spectral stability inherent in simple thin metallic film optical filters reduces their utility for calibrations or other critical work substantially.

Placing a layer of a dielectric material at the surface of the metal film can provide antireflection properties as well as physical protection and resultant spectral stability. However, such a layer does not necessarily reduce the reflectivity of the filter over the wavelength range of interest sufficiently to permit the filter to be used in critical and/or multiple-filter applications. In addition, this approach generally distorts the neutrality of the filter even at transmission values as high as 60%. For filters of lower transmittance the spectral neutrality of the filter is degraded substantially and such an antireflective coating is effective over only a relatively small wavelength interval.

In the paragraphs below, a number of structures having light-filtering properties are discussed to illustrate the state of the art. Not all of these devices are optical filters, as the films were designed for other purposes.

U.S. Pat. No. 3,781,089 of Fay and Cicotta discloses a neutral density filter with reduced surface reflection, for use in the visible portion of the spectrum with photographic apparatus. The filter is formed of alternating layers of a metal or metal alloy and a dielectric on a transparent substrate. The initial and final layers are of the metal or metal alloy. The dielectric layer is stated to have a lower index of refraction than the metal or metal alloy layer, and is preferably silicon monoxide, while the metal is preferably INCONEL(TM). This neutral density filter contains at least five layers, the number of metal or metal alloy layers being one more than the number of dielectric layers. The thickness of the layers is selected to achieve a predetermined optical density, and the thickness of each of the layers of the dielectric is selected to reduce the reflectance of the preceding layers of the filter to a minimum.

The Fay and Cicotta filter design is suitable for use in the visible region of the spectrum, but is unsuitable for critical use in the ultraviolet region since its reflectivity is too high and varies substantially as a function of wavelength. This neutral density filter also is not expected to be spectrally stable since it possesses no protective outer layer. Furthermore, as the Fay and Cicotta patent requires a minimum of three layers of metallic material, this design is appropriate only for filters operating at or above certain optical densities. The first metal layer is of a thickness to produce an optical density of approximately 0.25, and the additional metal layers raise this number. The highest percent transmittance achievable with this design is thus about 55%.

U.S. Pat. No. 3,990,784 of Gelber discloses an architectural glass coated with two layers of metal separated by a layer of a dielectric material. The ratio of the thicknesses of the two metal layers is a constant, while the thicknesses of the metal layers are adjusted to control the transmission properties of the coating. The thickness of the dielectric layer is such that the reflection from the coating is not strongly colored in the visible range. The coating is provided with an antireflection surface, located either adjacent to the substrate or on the outermost layer, facing away from the substrate. An additional layer of dielectric material can be provided to introduce color as seen from the exterior of the architectural glass without changing the low reflection from the architectural glass on the inside of the building. In the event that the multilayer coating is on the outside of the glass, this additional layer of dielectric is located on the outer surface of the glass coating. As shown in FIG. 4 of the reference, when the multilayer coating is to be employed on the inward-facing side of the glass, two additional layers of dielectric material are employed, one on the inward-facing surface of the coating and another between the coating and the glass substrate, this latter material being for the purpose of determining the color as seen from the outside. The inward-facing layer of dielectric provides antireflection properties. The first and last layers of dielectric in the coating are different materials, the former having a high index of refraction and the latter having a low index of refraction. The dielectric spacer layer between the two metal layers also has a high index of refraction, for best color as seen from the outside.

This structure will not function as a low reflection broad band neutral density filter since both its transmittance and its reflectivity vary substantially as a function of wavelength, and the reflectivity is objectionably high at certain wavelengths in the UV and in the visible ranges.

U.S. Pat. No. 4,101,200 of Daxinger discloses a light transmitting and absorbing multilayer coating for a transparent substrate, the initial layer which contacts the substrate being of silicon dioxide, and the remaining layers alternating between chrome and silicon dioxide.

This composition is spectrally unstable since the outer layer is a chromium layer which is subject to oxidation and loss of material upon cleaning. Additionally, transmission in the UV varies strongly as a function of wavelength, making it unsuitable as a broad-band neutral density filter.

In view of the limited useful wavelength ranges and limited spectral stabilities of prior art neutral density filters, it would be very desirable to have broad range neutral density optical filters covering a wide range of optical densities, having variations in nominal transmittance no greater than approximately 5% and reflectances no greater than approximately 5% over a substantial portion of the combined UV and VIS spectral range, and having protective outer layers to provide good spectral stability. Such filters are the subject of the present application.

SUMMARY OF THE INVENTION

The present invention provides a neutral density filter having low reflectance from both sides of the filter over a wide range of wavelengths from the ultraviolet through the visible region of the spectrum, and having a substantially flat transmittance profile as a function of wavelength. The filters of the invention typically vary in reflectance and transmittance by a maximum of ±5% over a wide range of wavelengths.

The broad band neutral density optical filter of the invention is a multilayer device including a transparent substrate; a layer of a first dielectric material on this substrate; a layer of a second dielectric material on the underlying layer of first dielectric material; a plurality of layers of metallic material, the first of these layers of metallic material being located on the underlying layer of second dielectric material; at least one spacing layer of dielectric material, one spacing layer of dielectric being located between successive layers of metallic material; a capping layer of dielectric material on the last of the layers of metallic material; and a terminating layer of a dielectric material different from the capping layer of dielectric and located on the capping layer. The final two layers of different dielectric materials provide physical protection and spectral stability, as well as excellent broad band low reflectance characteristics from the front side of the filter. The two layers of different dielectric materials between the substrate and the first layer of metallic material provide excellent broad band antireflection characteristics from the back side of the filter. Filters of desired optical densities are prepared by making appropriate selections of the numbers and thicknesses of the metallic layers of the filter.

BRIEF DESCRIPTION OF THE DRAWINGS

The invention will be better understood from a consideration of the following detailed description taken in conjunction with the drawing, in which.

DETAILED DESCRIPTION OF THE INVENTION

Figure 1:
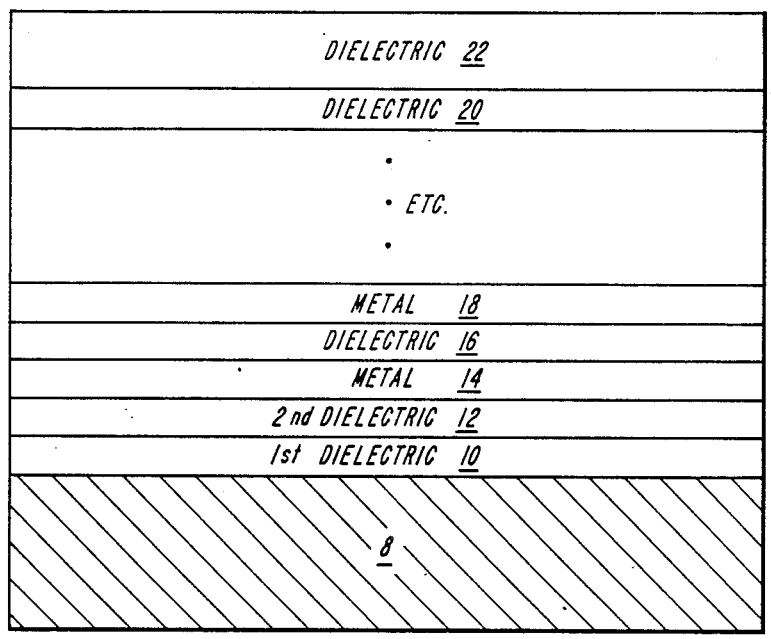
FIG. 1 is a cross sectional view of a broad band neutral density optical filter of the invention.

As shown in FIG. 1, the neutral density filters of the invention comprise a transparent substrate 8, a layer 10 of a first dielectric material coated on the substrate, a layer 12 of a second dielectric material coated on the first dielectric layer 10, a first layer 14 of metal or metal alloy coated on layer 12 of second dielectric material, a layer 16 of dielectric material coated on metallic layer 14, a second layer 18 of metal or metal alloy coated on layer 16, possible further alternating layers of dielectric and metal or metal alloy, a capping layer 20 of dielectric on the final layer of metal or metal alloy, and finally, a terminating layer 22 of another dielectric material. Dielectric material layers 10 and 12 are of different materials, as are the final two dielectric layers 20 and 22. The layers of metal or metal alloy are generally of the same material, though layers of different metallic materials may in principle be employed. Similarly, the layers of dielectric material which are in contact with the layers of metal or metal alloy are also generally composed of the same dielectric material, though this is not necessarily required.

Substrate 8 is transparent over the wavelength range of interest. Depending on this wavelength range, the substrate may be made of a wide variety of materials, including glass for the visible (VIS) range, quartz for the ultraviolet (UV) and VIS ranges, sapphire for the vacuum UV range of approximately 1700–2000Å certain plastics such as acrylics and polycarbonates for the VIS range, and certain inorganic crystals such as magnesium fluoride for use in the far UV from approximately 1200–2000Å. The transmission characteristics of possible substrate materials are generally known and in any case are readily measurable. For filters usable in the UV range above approximately 2000Å preferred substrate material is quartz.

The layers of metal or metal alloy employed in the neutral density filters of the invention are generally of nickel, chromium, or alloys of these metals such as nichrome and chromel. The absorption of radiation by these materials as a function of wavelength is relatively constant. The family of alloys containing nickel, chromium, and iron known as INCONEL (TM) is preferred, INCONEL 600 being especially preferred. The thicknesses selected for the metallic layers are a function of the optical density desired for the neutral density filter and also of the index of refraction of the adjacent dielectric material. The number of metallic layers and their thicknesses determine the resultant optical density. The thickness of each metallic layer is at least 10Å, with the maximum layer thickness being approximately 500Å. For practical purposes, the layers of metallic material are generally between approximately 10 and 100 Å thick. Between two and eight layers of metallic material are employed in the neutral density filters of the invention.

The neutral density filters of the invention contain between five and eleven layers of dielectric materials, the thicknesses of these layers depending in large part on the wavelength region over which the filters are to be rendered relatively nonreflective. Dielectric films for filters intended for use in the UV are typically 150–600Å thick, while films for use in the VIS range are typically somewhat thicker. The dielectric materials have indices of refraction in the range 1.3–2.5, preferred dielectric materials having refractive indices in the range 1.35 to 2.1, the most preferred material for the 2000–7000Å wavelength range having an index of refraction of approximately 1.85. A listing of some representative dielectric materials (and their nominal indices of refraction) is: aluminum oxide (1.63), quartz (1.46), silicon monoxide (1.55), titanium dioxide (2.20), magnesium fluoride (1.38), and hafnium oxide (1.85). Other dielectric metal oxides and fluorides will also serve, however.

The first dielectric layer 10 adjacent to the substrate has an index of refraction lower than that of the layer of second dielectric 12, and is preferably of aluminum oxide. The dielectric layers in contact with the several metal or metal alloy layers are preferrably of hafnium oxide. Other dielectrics can also be employed, case-by-case optimization of parameters being required. The outermost layer of dielectric material has an index of refraction different from the adjacent dielectric material layer, and higher than that of the final metal layer, for optimum achromaticity. This outermost layer is preferably of quartz, for filters intended for use in the 2000–7000Å wavelength range.

In the neutral density filters of the invention substrate 8 provides support for the several layers of dielectric material and metallic material which comprise the optical filter. The layers of metal or metal alloy absorb a portion of the incident light, the amount of light absorbed being a function of the number and thicknesses of these layers. The layers of dielectric material which are adjacent to layers of metal or metal alloy render the adjacent metallic layers nonreflective, or as a minimum, reduce the reflectivity of the metallic layers to acceptably low levels. The outermost two layers of dielectric material provide durability and scratch resistance, as well as excellent achromaticity for the resultant optical filter. These two layers of dielectric material, especially when employed in conjunction with an underlying layer of metallic material of an appropriate thickness, provide a significantly improved bandwidth of low reflection, relative to a single layer of dielectric. Similarly, the combination of the two innermost layers of dielectric material provide a broader nonreflective bandwidth than a single layer of dielectric, thereby providing excellent optical properties from the substrate side of the filter.

The parameters of a filter of the invention are determined by an iterative process, beginning with a defined filter configuration in which the numbers, types, and thicknesses of the layers comprising the filter are selected arbitrarily. The indices of refraction of the dielectrics are obtained from the literature, and the optical constants for the layers of metal or metal alloy are either obtained from the literature or are experimentally determined in a manner known to the art. With this information, transmission and reflectance curves for the defined filter are calculated in a manner known to the art. In this regard, see H. A. Macleod, "Thin Film Optical Filters," Macmillan Publishing Co., 1986. The necessary calculations are preferably carried out with the aid of a suitable computer program such as "Film Star" interactive software sold by FTG Software, PO Box 358, Chatham N.J. 07928, or other similar programs.

The approximate desired transmission level for the filter is next preliminarily determined by varying the numbers and thicknesses of the layers of metallic material and recomputing the transmission curve after each adjustment, until a satisfactory value is reached.

Next, the flatness of this transmission curve over the wavelength range of interest is improved, if necessary, by making further adjustments to the thicknesses of the metallic and dielectric layers of the filter, recomputing the transmission curve after each change. This optimization may also be done by a suitable computer program, once the layers which are to be varied are specified.

Once a reasonably flat transmission curve is obtained over the wavelength range of interest, the initial reflectance curve for the filter is calculated in a manner known to the art, preferably by aid of a suitable computer program. Typically, the same computer program which calculates the transmission curves also calculates reflectance upon command.

The initially-calculated reflectance will usually be above 10% at certain wavelengths, and commonly varies as a function of wavelength. It is therefore necessary to optimize the reflectance curve to achieve as low and as flat a reflectance over the selected range of wavelengths as possible. The reflectance curve is improved, if necessary, by varying the thicknesses of the outermost and innermost two or three layers of dielectric material, to optimize the reflectance from the front and rear of the filter, respectively, recomputing the reflectance curve after each change. Other dielectric layers may also be varied if desired, but such changes are generally not required. This optimization may also be done by a suitable computer program, once the layers which are to be varied are specified.

The aforementioned optimizations of the reflectances from the front and rear of the filter frequently result in changes in the predicted transmission curve, necessitating reoptimization of the transmission characteristics of the filter in the manner described above. In this reoptimization of transmission, the thicknesses of inner metallic layers are preferably varied, to minimize disruption of the previously-determined reflectance characteristics of the filter.

The reoptimization of transmission may in turn change the predicted reflectance curve, necessitating its reoptimization. This process of alternately optimizing the transmission and reflectance curves of the filter is continued until the desired transmission and low reflectance are achieved over the wavelength range of interest, and the respective curves are sufficiently flat.

The neutral density filters of the invention are prepared using procedures and equipment well known to those skilled in the art. Suitably-cleaned substrate blanks are placed in the substrate fixture of an optical coating vacuum chamber equipped with sources of the several coating materials to be deposited, means for exciting these coating materials sequentially into the vapor state, and means for monitoring the thicknesses of the deposited coatings. The coating materials are excited by an electron beam or by such alternatives as thermal or sputtering techniques. The monitoring means may be any of a variety of devices, such as a simple optical monitor with or without a chip changer, or a calibrated thickness monitor such as a quartz crystal monitor. The chamber is pumped down to a vacuum of approximately $6 \times 10^{-5}$ Torr or whatever vacuum is appropriate for the materials to be deposited, an electric field is imposed across the apparatus to create a glow discharge in the chamber to provide final cleaning of the surfaces to be coated, then the chamber is repumped. Each coating material is heated in sequence at a sufficient temperature to vaporize it, and for a time sufficient to deposit the desired coating thickness.

EXAMPLE 1

Figure 2A:
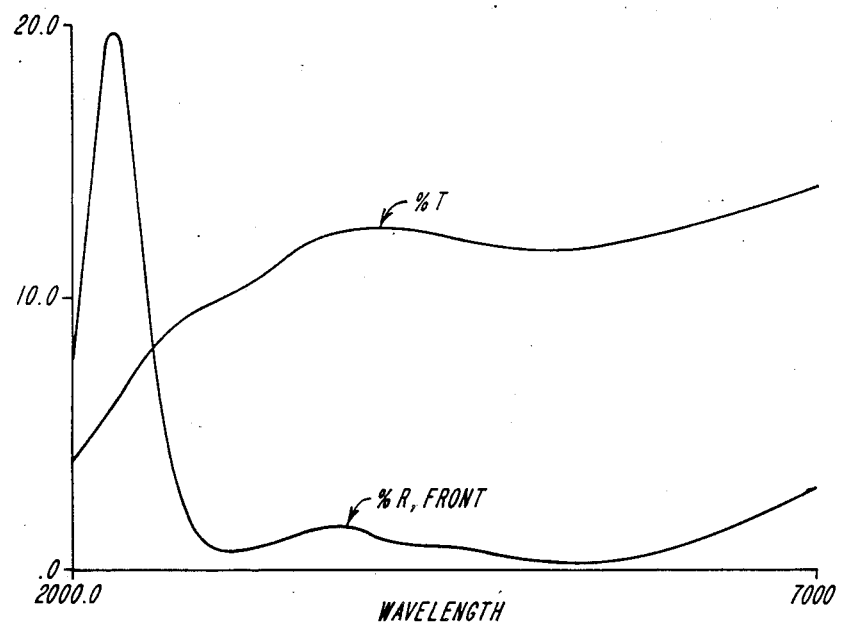
FIG. 2A is a chart illustrating the measured transmittance and front reflectance of an 11-layer neutral density optical filter of the invention having a nominal transmittance of approximately 12%.
Figure 2B:
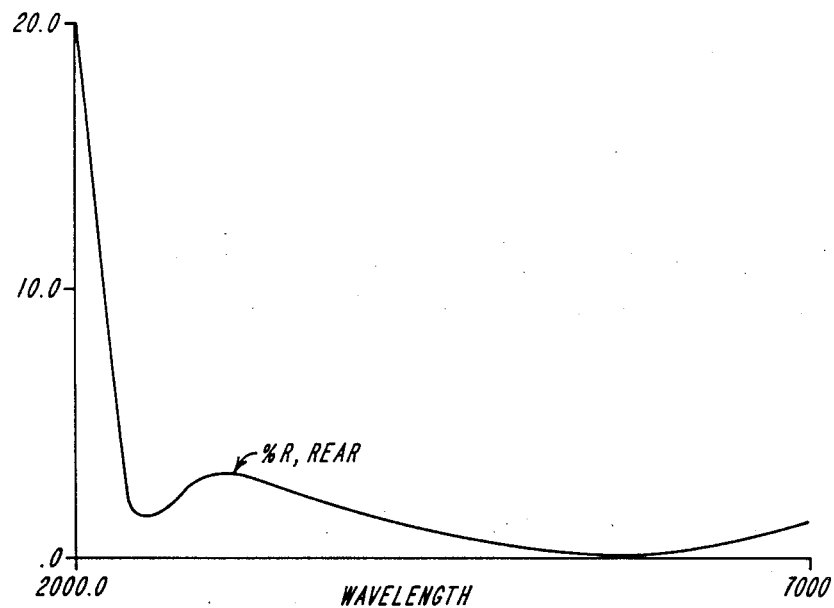
FIG. 2B is a chart illustrating the rear reflectance of the filter of FIG. 2A.
Figure 2C:
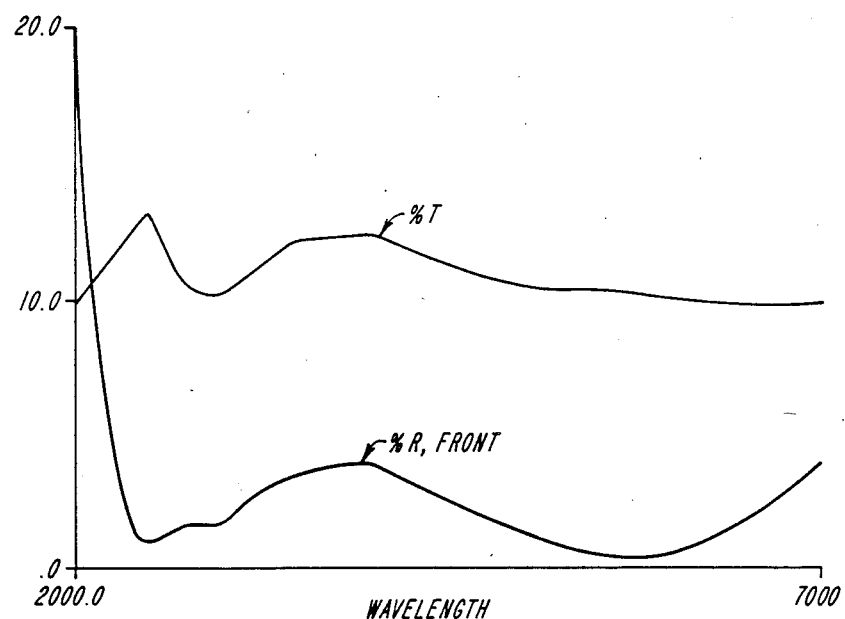
FIGS. 2C and 2D present the predicted optical properties of the neutral density filter whose actual transmittance and reflectance were presented in FIGS. 2A and 2B.
Figure 2D:
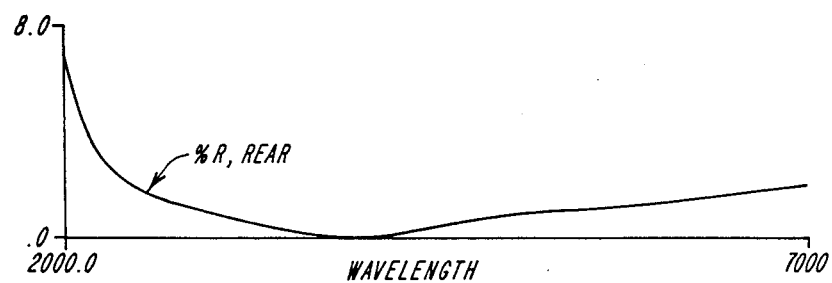
Figure 3A:
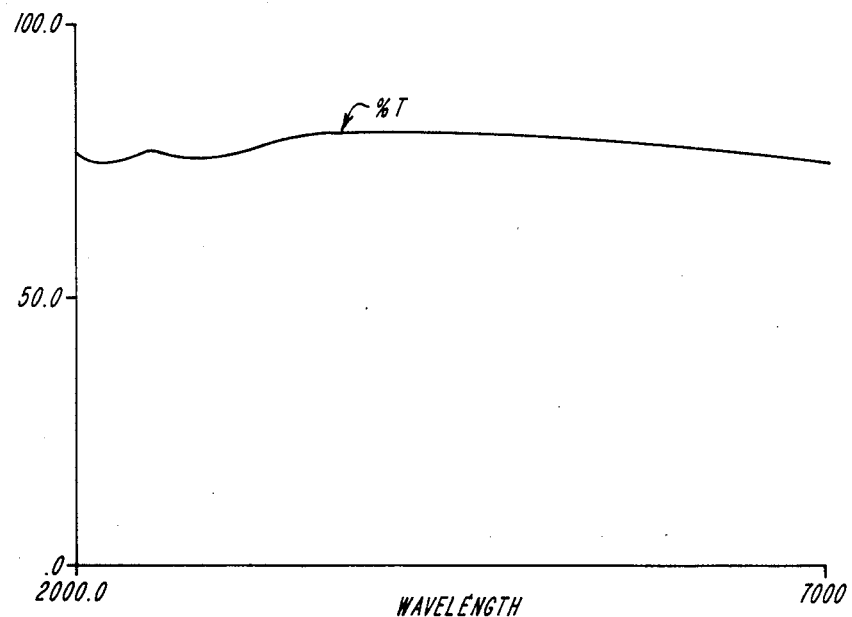
FIGS. 3-11 are charts of the optical properties predicted for a series of filters of various nominal optical densities and numbers of metal layers, constructed in accordance with the invention.
Figure 3B:
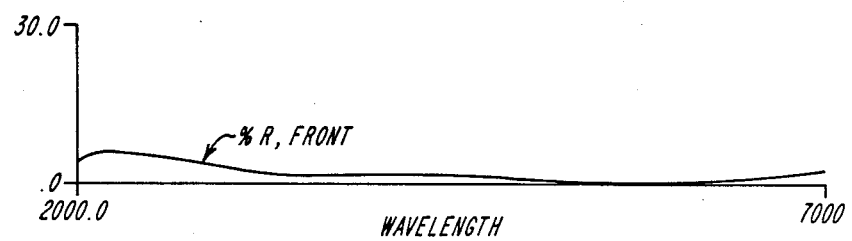
Figure 3C:
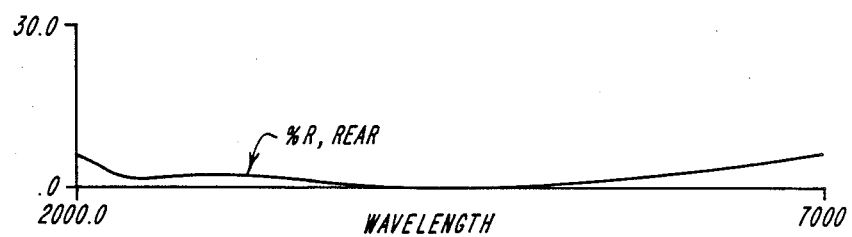
Figure 4A:
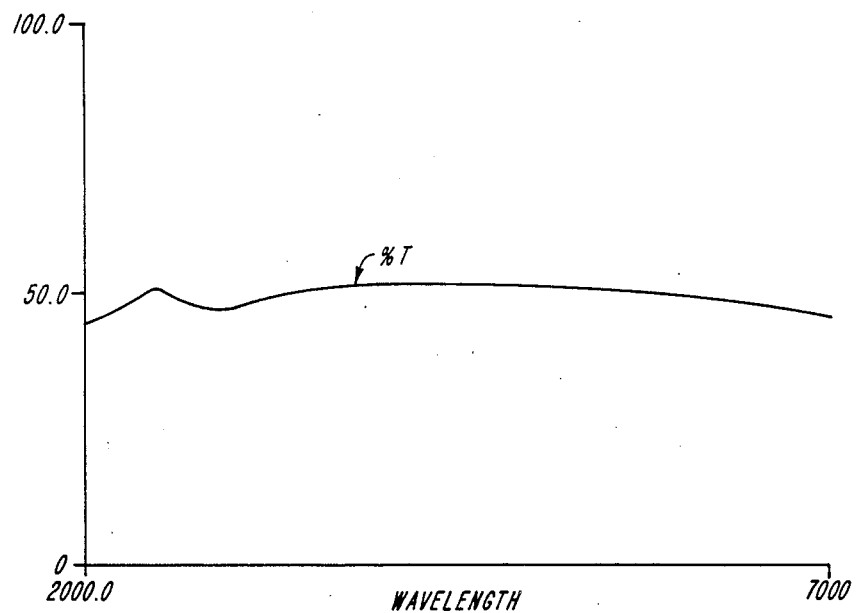
Figure 4B:
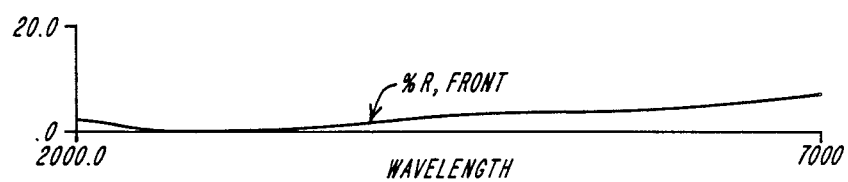
Figure 4C:
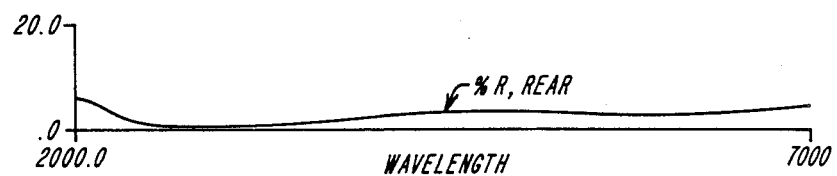
Figure 5A:
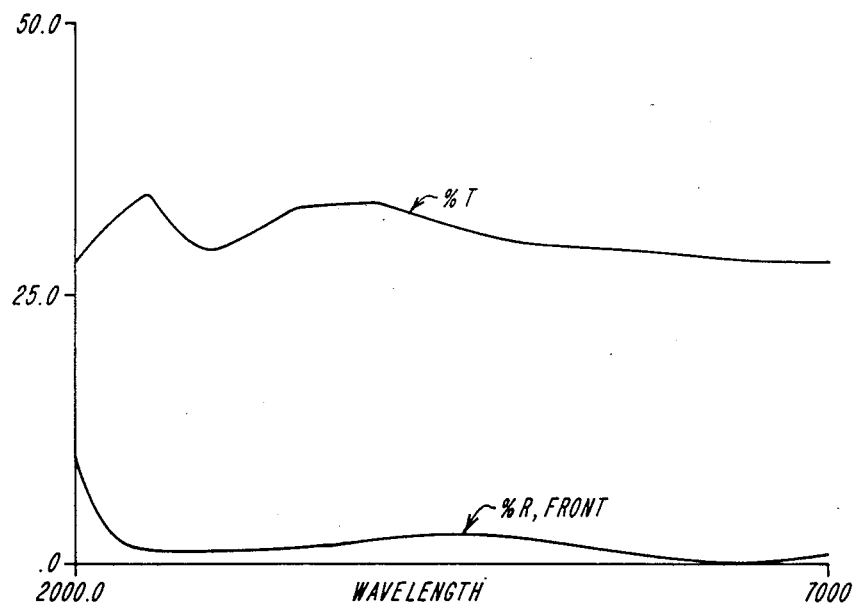
Figure 5B:
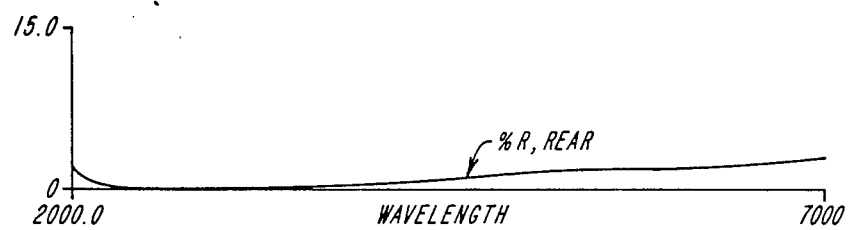
Figure 6A:
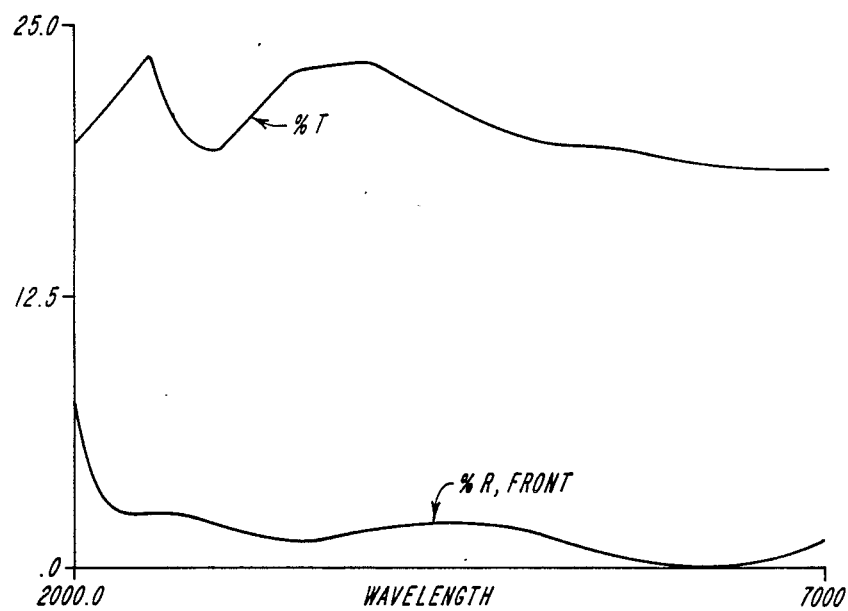
Figure 6B:
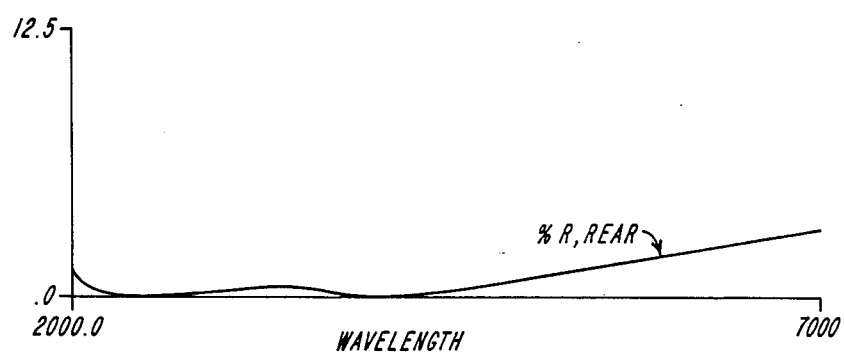
Figure 7A:
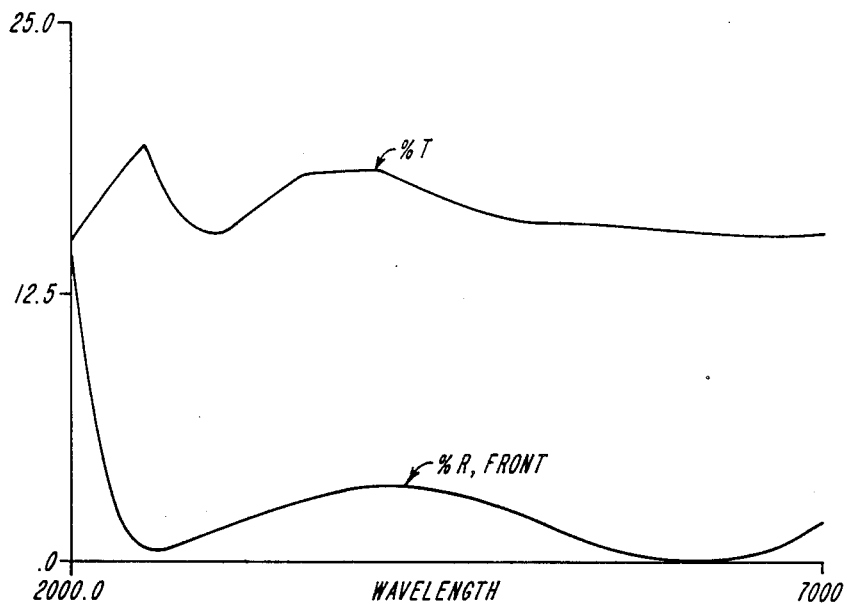
Figure 7B:
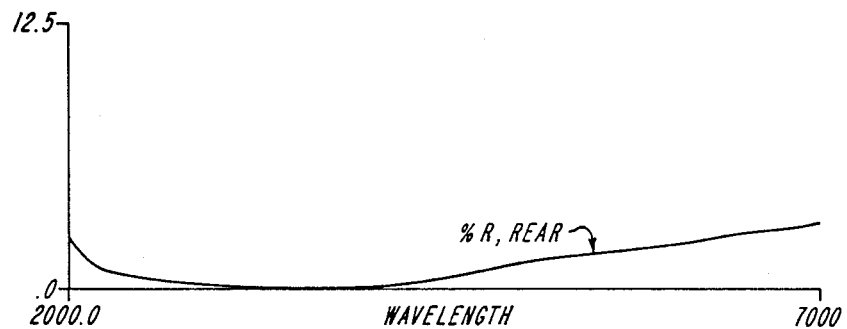
Figure 8A:
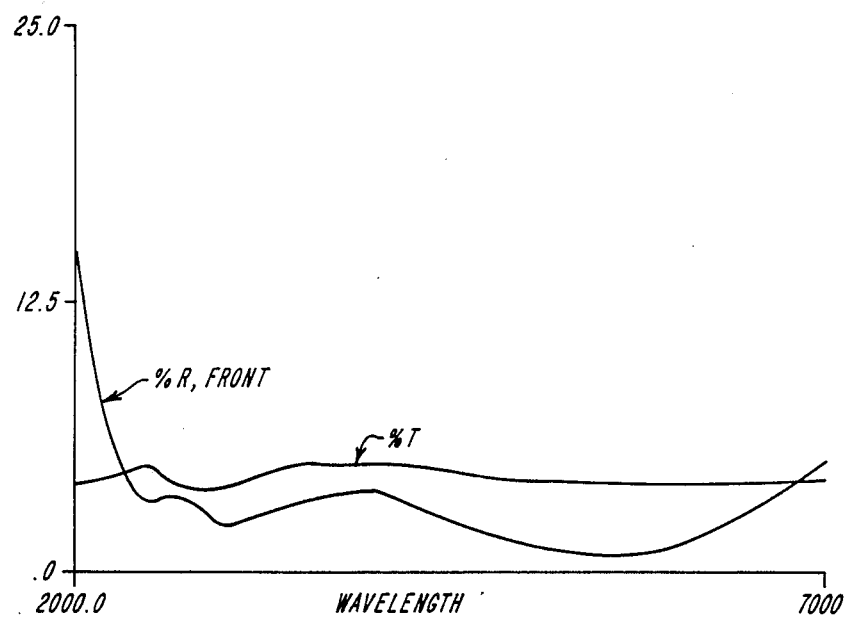
Figure 8B:
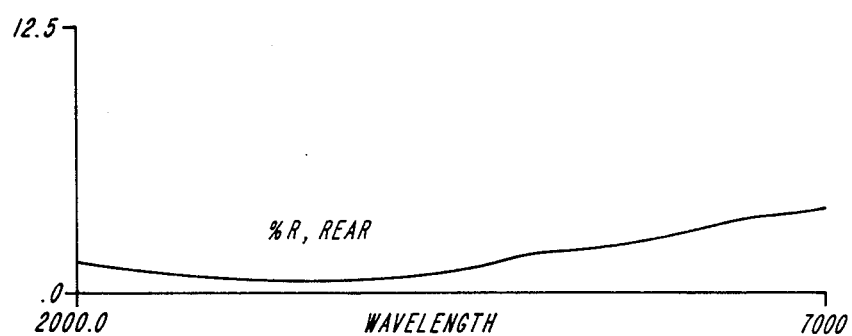
Figure 9A:
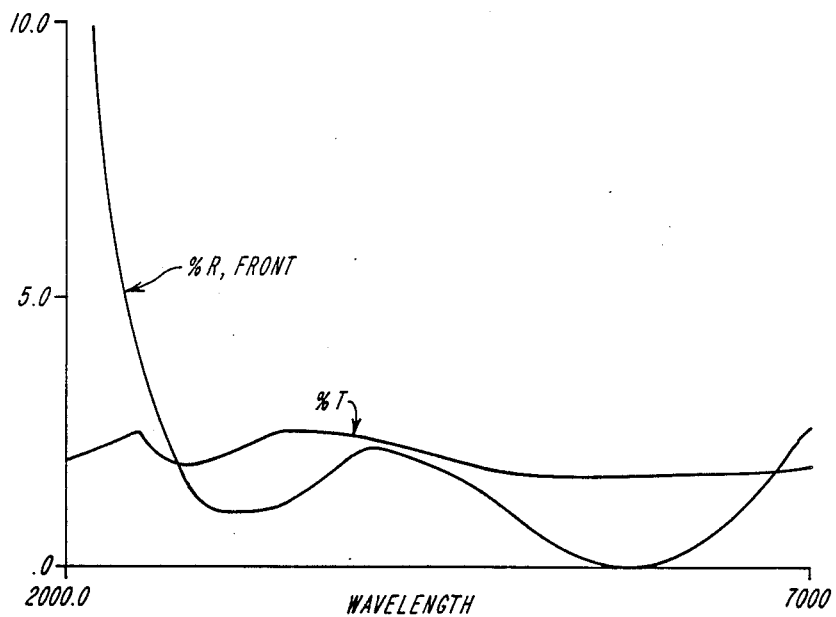
Figure 9B:
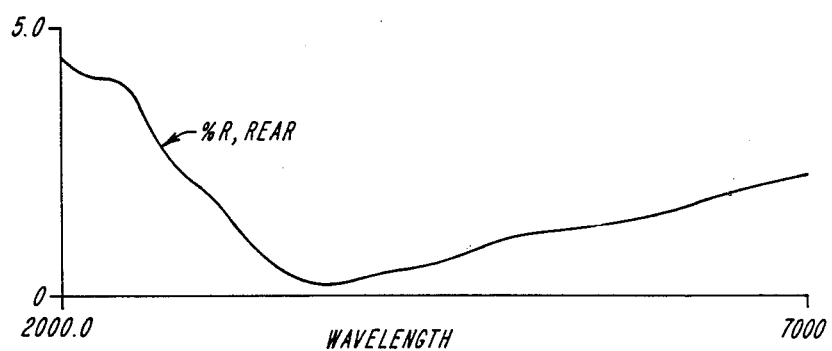
Figure 10A:
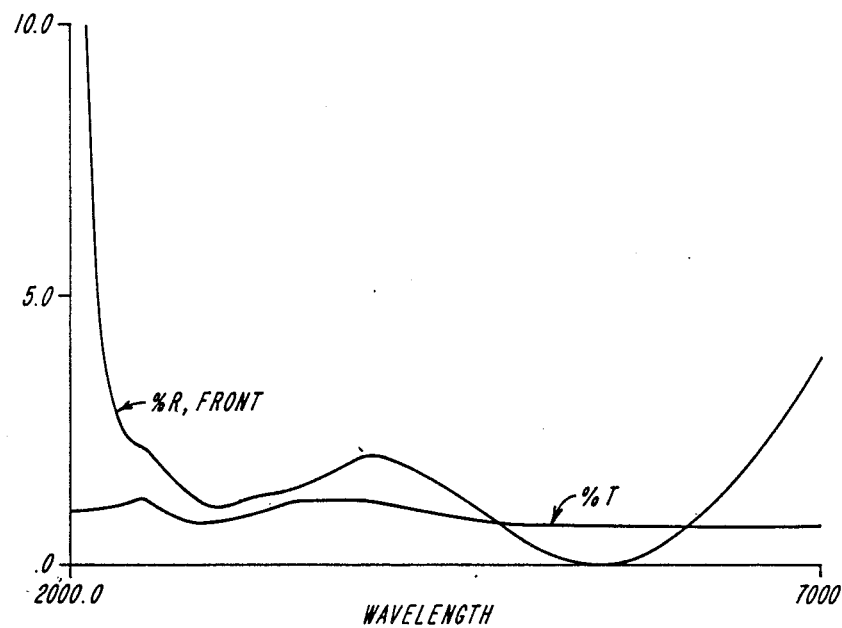
Figure 10B:
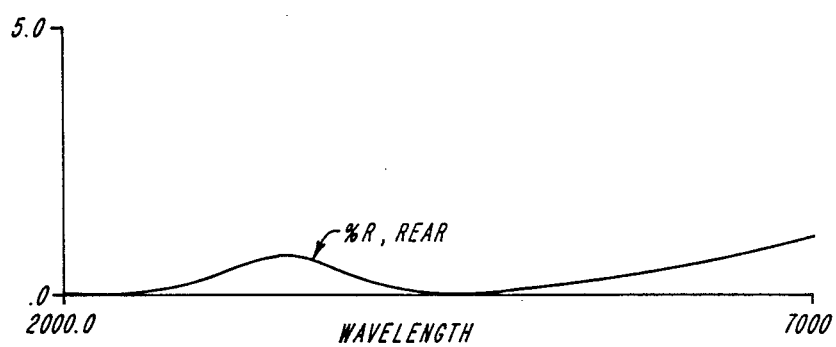
Figure 11A:
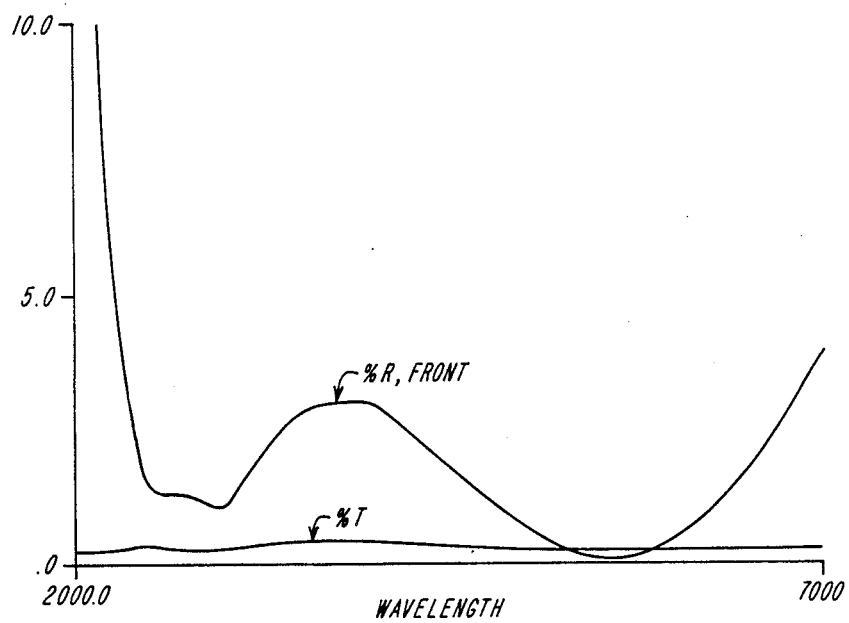
Figure 11B:
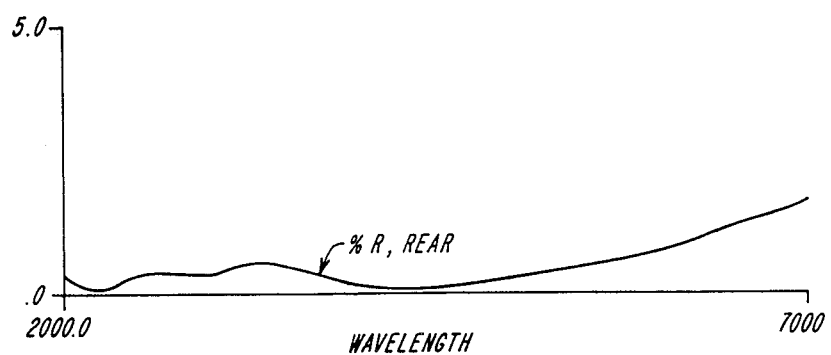

A neutral density filter made up of successive layers of aluminum oxide (520A), hafmium oxide (220A), INCONEL (30A), hafmium oxide (285A), INCONEL (60A), hafmium oxide (370A), INCONEL (135A), hafmium oxide (330A), INCONEL (60A), hafmium oxide (186A), and quartz (525A) on a quartz substrate was prepared using the above-described procedure and equipment. Suitably-cleaned substrate blanks were placed in the substrate fixture of an optical coating vacuum chamber equipped with sources of the coating materials to be deposited, an electron beam for vaporizing the coating materials, and a quartz crystal monitor to control the thicknesses of the deposited coatings. The chamber was pumped down to a vacuum of approximately $6 \times 10^{-5}$ Torr, an electric field was imposed across the apparatus to create a glow discharge in the chamber to provide final cleaning of the surfaces to be coated, then the chamber was repumped. Each coating material was heated in sequence at a sufficient temperature to vaporize it, and for a time sufficient to deposit the specified coating thickness. The finished filter was then characterized with a spectrophotometer for reflectance and transmission. The transmission and reflectance curves for this filter are presented in FIGS. 2A and 2B, and those predicted for this filter are shown in FIG. 2C. It is seen that the agreement between the predicted and experimental curves is quite good, though not perfect, and suggests that the charts for the predictive examples shown in FIGS. 3–11 are qualitatively and semiquantitatively correct. The discrepancies are presumably due to slight errors in the optical constants employed in the calculations at certain wavelengths, as well as slight errors in the thicknesses of the deposited layers.

PREDICTIVE EXAMPLES

The following examples are provided to illustrate the optical characteristics to be expected from neutral density filters constructed in accordance with the teachings of the present application.

The optical constants for a layer of metallic material at various wavelengths are a function not only of the identity of the particular material, but also depend on how the metallic layer was prepared. Thus, to obtain accurate optical constants at various wavelengths for layers of a given metallic material prepared by a given process, one must prepare a layer of the material by the given process, take accurate measurements of reflectance from both surfaces, the transmittance, and the physical thickness at a large number of wavelengths, and calculate the requisite constants in the manner known to those skilled in the art. This is time-consuming and expensive, and as a result, not often done. Instead, researchers in this area frequently estimate the desired optical constants from data in the optical literature or employ the numbers supplied by the manufacturer of the metallic coating material. This approach is generally adequate for qualitative or semiquantitative purposes, but results in imperfect agreement between calculated and experimental transmittance and reflectance curves.

The expected optical performance data were generated by computer, based on input of the number, thicknesses, and optical constants for the various layers of the metallic and dielectric materials employed.

In these examples, INCONEL 600 (TM) is taken as the metal alloy. Hafnium oxide, having an index of refraction of 1.85, is taken as the dielectric material contacting the layers of the metal alloy. The initial layer of dielectric material in contact with the substrate is taken as aluminum oxide having an index of refraction of 1.63, and the outermost layer of dielectric material is taken as quartz having an index of refraction of 1.46.

The curves shown in FIGS. 3–11, were generated using the optical constants for INCONEL 600 listed in Table I.

TABLE I

| INCONEL 600 OPTICAL CONSTANTS | | | |
|---|---|---|---|
| Wavelength | (n, k) | Wavelength | (n, k) |
| 2000 Å | (1.050, 2.400) | 2500 Å | (1.100, 2.300) |
| 3000 Å | (1.900, 1.860) | 3500 Å | (1.750, 2.050) |
| 4000 Å | (1.700, 2.300) | 4500 Å | (1.900, 2.470) |
| 5000 Å | (2.050, 2.700) | 5500 Å | (2.300, 2.800) |
| 6000 Å | (2.600, 2.900) | 6500 Å | (2.900, 3.000) |
| 7000 Å | (3.300, 3.000) | 8000 Å | (3.600, 3.000) |

A number of predictive examples are summarized in Table II below. The expected optical properties of filter samples 1–9 are shown in FIG. 3–11, respectively.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE II

| Exemplary Neutral Density Filters | | | | | |
|---|---|---|---|---|---|
| Layer Material[a] | Layer Thickness[b] | Layer Material[a] | Layer Thickness[b] | Layer Material[a] | Layer Thickness[b] |
| Sample No. 1 | | Sample No. 2 | | Sample No. 3 | |
| D(1) | 520 | D(1) | 520 | D(1) | 520 |
| D | 220 | D | 220 | D | 220 |
| M | 15 | M | 20 | M | 20 |
| D | 420 | D | 297 | D | 285 |
| M | 15 | M | 40 | M | 40 |
| D | 225 | D | 292 | D | 340 |
| Q | 700 | M | 30 | M | 60 |
| | | D | 186 | D | 330 |
| | | Q | 524 | M | 30 |
| | | | | D | 186 |
| | | | | Q | 525 |
| Sample No. 4 | | Sample No. 5 | | Sample No. 6 | |
| D(1) | 520 | D(1) | 520 | D(1) | 520 |
| D | 220 | D | 220 | D | 220 |
| M | 30 | M | 30 | M | 50 |
| D | 285 | D | 285 | D | 285 |
| M | 60 | M | 60 | M | 100 |
| D | 340 | D | 340 | D | 340 |
| M | 70 | M | 100 | M | 170 |
| D | 330 | D | 330 | D | 330 |
| M | 40 | M | 40 | M | 80 |
| D | 186 | D | 186 | D | 186 |
| Q | 525 | Q | 525 | Q | 525 |
| Sample No. 7 | | Sample No. 8 | | Sample No. 9 | |
| D(1) | 520 | D(1) | 520 | D(1) | 520 |
| D | 220 | D | 220 | D | 220 |
| M | 40 | M | 40 | M | 40 |
| D | 300 | D | 330 | D | 300 |

TABLE II-continued

Exemplary Neutral Density Filters

| Layer Material[a] | Layer Thickness[b] | Layer Material[a] | Layer Thickness[b] | Layer Material[a] | Layer Thickness[b] |
|---|---|---|---|---|---|
| M | 60 | M | 60 | M | 60 |
| D | 300 | D | 330 | D | 300 |
| M | 200 | M | 100 | M | 100 |
| D | 350 | D | 300 | D | 300 |
| M | 140 | M | 200 | M | 200 |
| D | 370 | D | 360 | D | 300 |
| M | 60 | M | 140 | M | 130 |
| D | 180 | D | 360 | D | 330 |
| Q | 500 | M | 60 | M | 140 |
|   |   | D | 180 | D | 340 |
|   |   | Q | 450 | M | 60 |
|   |   |   |   | D | 180 |
|   |   |   |   | Q | 500 |

[a]D(l) is aluminum oxide (Al$_2$O$_3$). D stands for HfO$_2$. M stands for INCONEL 600 and Q stands for quartz.
[b]Layer thicknesses are shown in units of Angstroms.

I claim:

1. A neutral density optical filter, comprising:
   a transparent substrate;
   a layer of a first dielectric material on said substrate;
   a layer of a second dielectric material on said layer of first dielectric material;
   a plurality of layers of metallic material, the first of said layers of metallic material being located on said layer of second dielectric material;
   at least one spacing layer of dielectric material, each spacing layer of dielectric material being located between successive layers of said metallic material;
   a capping layer of dielectric material on the last of said layers of metallic material; and
   a terminating layer of a dielectric material different from said capping layer of dielectric material and located on said capping layer.

2. The neutral density filter of claim 1 wherein said substrate is quartz.

3. The neutral density filter of claim 1 wherein said first dielectric material is aluminum oxide.

4. The neutral density filter of claim 1 wherein said second dielectric material is hafnium oxide.

5. The neutral density filter of claim 1 wherein said metallic material is selected from the group consisting of nickel, chromium, and alloys thereof.

6. The neutral density filter of claim 5 wherein said metallic material is a nickel-chromium-iron alloy.

7. The neutral density filter of claim 1 wherein said spacing layers of dielectric material are hafnium oxide.

8. The neutral density filter of claim 1 wherein said capping layer of dielectric material is hafnium oxide.

9. The neutral density filter of claim 1 wherein said terminating layer of dielectric material is quartz.

10. The neutral density filter of claim 1 wherein the number of layers of metallic material is between two and eight.

* * * * *